(12) United States Patent
Siedlaczek (10) Patent No.: US 7,637,052 B2
(45) Date of Patent: Dec. 29, 2009

(54) MACHINE FOR POTTING FLOWER POTS

(76) Inventor: Udo Siedlaczek, Hubertusstrasse 26, 47638 Straelen (DE)

( * ) Notice: Subject to any disclaimer, the term of this patent is extended or adjusted under 35 U.S.C. 154(b) by 333 days.

(21) Appl. No.: 10/566,447

(22) PCT Filed: Jul. 21, 2004

(86) PCT No.: PCT/EP2004/008165

§ 371 (c)(1),
(2), (4) Date: Aug. 4, 2006

(87) PCT Pub. No.: WO2005/011363

PCT Pub. Date: Feb. 10, 2005

(65) Prior Publication Data

US 2006/0265947 A1      Nov. 30, 2006

(30) Foreign Application Priority Data

Jul. 29, 2003    (DE) .............................. 103 34 851

(51) Int. Cl.
*A01C 5/06* (2006.01)
*A01C 7/04* (2006.01)
*A01G 9/10* (2006.01)
*B65C 9/18* (2006.01)

(52) U.S. Cl. ...................... 47/1.01 P; 156/541; 156/542

(58) Field of Classification Search ............... 47/1.01 P, 47/1.01 S, 901; 156/538, 539, 541, 542, 156/556, 566
See application file for complete search history.

(56) References Cited

U.S. PATENT DOCUMENTS

| 2,826,003 | A | * | 3/1958 | Oki et al. ................. 47/1.01 R |
| 4,294,644 | A | * | 10/1981 | Anderson ................... 156/361 |
| 5,713,403 | A | * | 2/1998 | Clusserath et al. .......... 141/101 |
| 6,905,399 | B2 | * | 6/2005 | Lischka ....................... 451/72 |
| 7,062,894 | B2 | * | 6/2006 | Loffler ......................... 53/585 |

* cited by examiner

*Primary Examiner*—Michael R Mansen
*Assistant Examiner*—Monica L Williams
(74) *Attorney, Agent, or Firm*—Woodard, Emhardt, Moriarty, McNett & Henry LLP (57) ABSTRACT

The invention proposes a potting machine (1) for potting flowerpots (2), with a conveying device (3) comprising a plurality of pot retainers (4) for a respective flowerpot (2), and with a housing ring (5) surrounding the conveying device (3). To enable the flowerpots to be labeled in a simple manner even during the potting operation, the potting machine (1) comprises a labeling device (11) which is provided with a dispensing tongue (12) for stripping off labels (13) and applying them to the flowerpots (2). The labeling device (11) is connected to a positioning device (22) comprising a joint (23) and having a positioning arm (24) for pivoting the labeling device (11) and positioning the dispensing tongue (12) against the flowerpots (2).

19 Claims, 5 Drawing Sheets

MACHINE FOR POTTING FLOWER POTS

CROSS-REFERENCES TO RELATED APPLICATIONS

This application is a National Stage filing of International Application PCT/EP2004/008165, filed Jul. 24, 2004, claiming priority to German Application No. 103 34 851.4, filed Jul. 29, 2003, entitled "MACHINE FOR POTTING FLOWER POTS". The subject application claims priority to PCT/EP2004/008165 and to German Application No. 103 34 851.4 and incorporates both by reference, in their entirety.

BACKGROUND OF THE INVENTION

The invention relates to a potting machine for potting flowerpots, with a conveying device comprising a plurality of pot retainers for a respective flowerpot, and with a housing ring surrounding the conveying device.

Potting machines of the aforementioned type are already known from practice. Such potting machines comprise a conveying device, generally a type of carousel, which revolves during the potting operation. The conveying device comprises a plurality of pot retainers on which respective flowerpots are arranged. The conveying device is surrounded by a housing ring which outwardly delimits the potting machine and additionally serves to catch falling soil during the potting operation.

The operation of potting flowerpots using such a potting machine generally takes place continuously owing to the revolving conveying device, whereby the process steps of only one pot are discussed in detail below. First of all the flowerpot to be potted is removed from a stack of flowerpots and placed on a free pot retainer of the conveying device. In the next process step the flowerpot is filled with soil. A hole is then made in the soil which has been filled into the pot, so that a plant to be potted can be inserted in the next process step. Finally, the flowerpot is removed from the conveying device and discharged via a discharge belt for further use. The aforementioned individual process steps here may be automated, partially automated or else carried out manually.

Since it is required to identify the plants that have been potted, the flowerpots are labeled. What happens in practice is that flowerpots which have already been labeled beforehand are delivered to the potting company, with the result that ready-labeled flowerpots are supplied to the potting machine. However, prelabeling has various disadvantages. On the one hand, prelabeling requires sufficient logistics with appropriate storage provision at the premises of the potting company, since corresponding quantities of prelabeled flowerpots have always to be kept in store. On the other hand, the labels applied beforehand to the flowerpots may become soiled, damaged or even torn during the potting operation. The object of the present invention is thus to avoid the problems mentioned above.

To achieve the above-indicated object, the potting machine comprises a labeling device assigned thereto for labeling the flowerpots. The labeling device itself comprises a dispensing tongue for stripping off the labels and applying them to the flowerpots. Furthermore, the labeling device is connected to a positioning device which comprises a joint and has a positioning arm in order in this way to enable the labeling machine to be pivoted and the dispensing tongue to be positioned against the flowerpots.

The design according to the invention offers a number of advantages. The direct assignment of the labeling device to the potting machine ensures that it is no longer necessary for flowerpots with ready-applied labels to be held in stock. The labeling operation takes place directly in conjunction with the potting operation and thus in dependence on the plants to be potted. Only corresponding labels have to be held in stock, or else a printer is required which prints the labels in situ shortly before application to the flowerpots. Furthermore, the direct assignment of the labeling device to the potting machine means that the labeling process is integrated into the potting process, this not being a problem owing to the continuous operation of the potting machine, and the potting speed not being adversely affected by the labeling. Particular importance attaches to the positioning device in this regard. The positioning device with the positioning arm and the joint makes it readily possible for the user to pivot the labeling device into a use position, in which the dispensing tongue bears against the flowerpots for application of the labels, or into a non-use position when no labels are applied to the flowerpots.

It will of course be understood in this regard that the integration of the labeling device into the potting process, and thus the labeling, is tailored to the speed of the conveying device such that each flowerpot is provided with a label.

It is of particular advantage for the positioning arm to be connected to a mounting means for detachable mounting on the housing ring or on a discharge belt assigned to the potting machine. The detachable mounting of the labeling device on the potting machine or on the discharge belt assigned to the potting machine finally results in two significant advantages. First, existing potting machines may be readily retrofitted with the labeling device according to the invention comprising a positioning device. Second, the labeling device according to the invention may be integrated at any point into the potting process as required. Labeling may thus take place, for example, between the flowerpot-destacking and soil-filling operations or else while the flowerpots are being discharged.

In order to allow rapid and secure mounting, the mounting means may be intended for frictional and/or positive mounting. Thus, for example, it is readily possible for the mounting means to be clamped on or to the housing ring or else attached thereto by a screw fixing. The mounting means may be formed, for example, as a bent sheet-metal portion provided with a central locating slot. The locating slot is made to match the thickness of the housing ring and is pushed onto the latter from above. It will of course be understood that it is also possible in principle to provide a non-detachable mounting instead of the detachable mounting. In both cases, however, the joint between the mounting means and the positioning arm is provided so as to allow a movement of the first positioning arm with respect to the mounting means.

Although it is possible to position the labeling device using only one positioning arm, which may, if appropriate, also have a number of bent or angled portions, provision may also be made for the positioning device to comprise at least one further positioning arm, the individual positioning arms then being connected to one another in each case via a further joint. In this case it is appropriate to connect the labeling device to the further positioning arm. In the case of the one-armed embodiment, the labeling device is then accordingly connected to the single positioning arm.

To enable both small and large flowerpots to be labeled at the desired point, provision is additionally made for the labeling device to be height-adjustable, in particular via the positioning device. This height adjustment may take place in principle at any point between the mounting means and the dispensing tongue. A structurally particularly simple embodiment provides that the positioning arm is height-adjustable with respect to the mounting means, in which case the positioning arm is designed as an angle and comprises a horizontal leg and a vertical leg. The horizontal leg here is used for mounting the labeling device, while the vertical leg is used for mounting and height adjustment. The vertical leg in this case is then part of the joint. Moreover, the horizontal leg as part of the further joint makes it possible not only to pivot the labeling device about the longitudinal axis of the horizontal leg but also to displace it along the horizontal leg.

A spring device which acts on the labeling device may be provided so that the dispensing tongue of the labeling device is positioned automatically and with the required pressing force against the flowerpots. In the case of the two-armed embodiment, the spring device may then be designed as at least one tension-spring means which is provided between the positioning arms. In the case of the one-armed embodiment, i.e. where there is only one positioning arm, the tension-spring means is provided between the positioning arm and the housing ring or else the discharge belt, depending on the arrangement of the labeling device.

In order to tailor the labeling device, and thus the dispensing tongue, to the conicality of the flowerpots, it is appropriate for the labeling device to be able to pivot about the longitudinal axis of the positioning arm or of the further positioning arm or about an axis parallel thereto. A further joint is then provided for this purpose.

It is possible in principle to design the individual joints in the manner of simple hinges such that pivoting is possible about only one axis. However, it is also possible in principle to design individual hinges or each of the hinges such that movement is possible about at least two axes. Also included here incidentally are ball joints, which after all allow movement in any direction.

However, the joints should in each case be assigned locking means for locking in any pivoting position to enable the labeling device to be fixed in any desired position as required.

BRIEF SUMMARY OF THE INVENTION

The present invention discloses a potting machine for potting flowerpots, with a conveying device comprising a plurality of pot retainers for a respective flowerpot, and with a housing ring surrounding the conveying device. To enable the flowerpots to be labeled in a simple manner even during the potting operation, the potting machine comprises a labeling device which is provided with a dispensing tongue for stripping off labels and applying them to the flowerpots. The labeling device is connected to a positioning device comprising a joint and having a positioning arm for pivoting the labeling device and positioning the dispensing tongue against the flowerpots.

One object of the present invention is to provide an improved machine for potting flowerpots.

Related objects and advantages of the present invention will be apparent from the following description.

DETAILED DESCRIPTION OF THE INVENTION

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
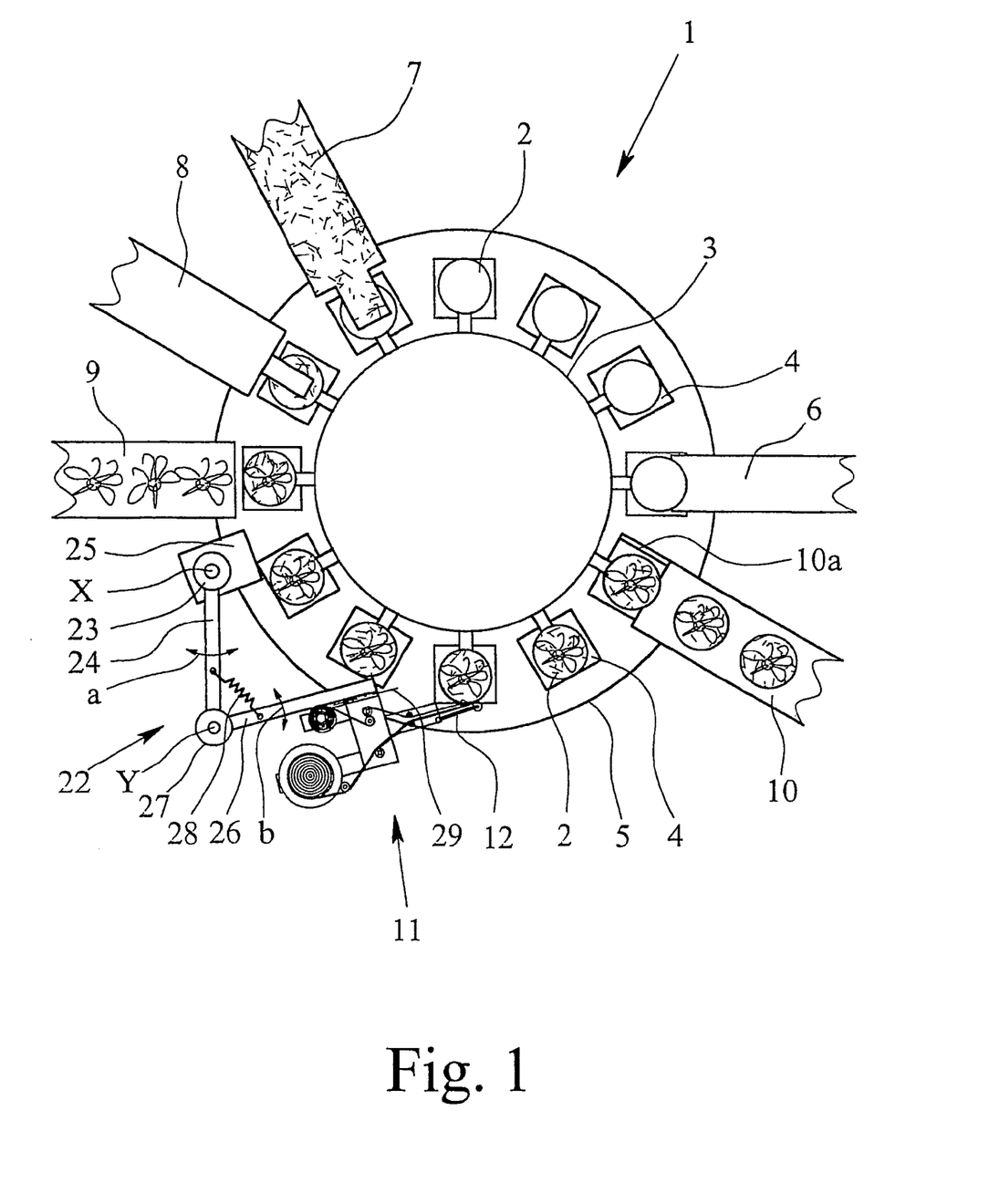
FIG. 1 is a schematic plan view of a potting machine according to one embodiment of the present invention.

FIG. 1 depicts a potting machine 1 for potting flowerpots 2. The potting machine 1 comprises a conveying device 3, designed here as a carousel, on which a plurality of pot retainers 4 are provided for a respective flowerpot 2. It should be pointed out that, instead of the conveying device 3 designed in the manner of a carousel, it is also possible in principle to provide a revolving conveying means in the manner of a conveyor belt. The conveying device 3 is situated inside a housing ring 5. The housing ring 5 is an upwardly open housing which serves, on the one hand, to form an outer boundary and, on the other hand, to catch falling soil or flowerpots 2 during the potting operation.

The potting machine 1 depicted in FIG. 1 comprises a device 6 for the stacking of flowerpots 2, a device 7 for introducing soil into the flowerpots 2, a device 8 for introducing a hole into the soil in the flowerpots 2, a device 9 for introducing a plant, and a discharge device 10 having a scraper 10a. It should be pointed out that the individual devices have only been represented schematically. Moreover, a control device which controls and coordinates the individual process sequences and which is used to control the speed of the conveying device 3 and the speeds of the individual devices 6 to 9 and that of the discharge device 10 has not been represented.

The potting machine 1 represented is a fully automatic potting machine. However, it should be pointed out that it is also possible in principle to dispense with each of the individual devices 6 to 10 as required. The corresponding activities can also be carried out manually. Partial automation is also possible. Thus, for example, the devices 6 to 8 and 10 may be provided, while the planting takes place manually. It is also possible to dispense with the devices 8 and 9 if the plants are introduced at some other point. In that case the potting machine 1 serves only for introducing soil.

The potting machine 1 is now additionally provided with a labeling device 11 for labeling the flowerpots 2 during the potting operation. The labeling device 11, which is represented in more detail in FIG. 2, comprises a dispensing tongue 12. During labeling, the dispensing tongue 12 has its end situated against the flowerpots 2 and strips a respective label 13 and applies it to each of the flowerpots 2. It will be understood here that the labeling device 11 is coupled in the same way with the control device (not shown) and integrated into the overall process like the other devices.

Figure 2:
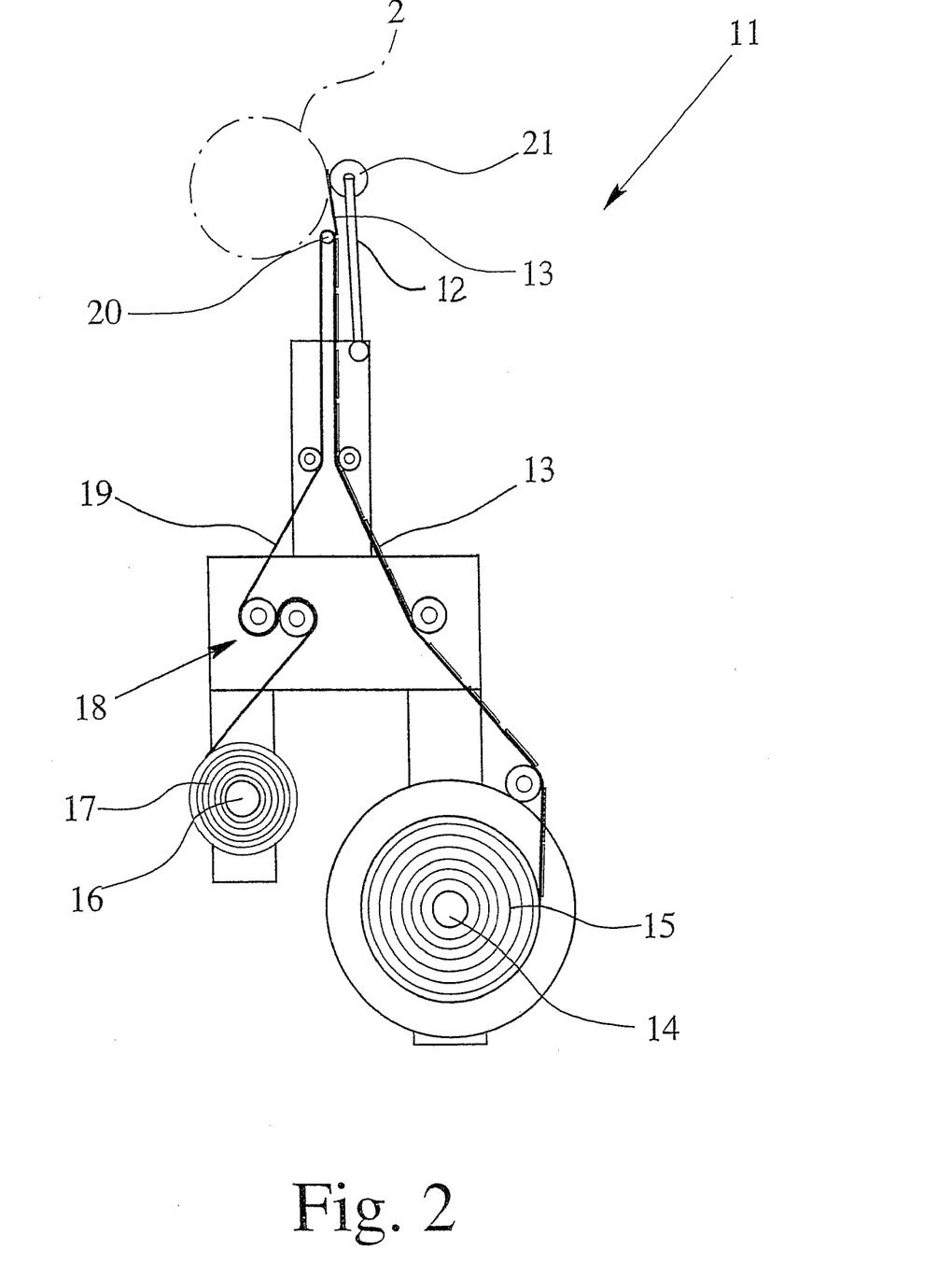
FIG. 2 is a schematic plan view of a labeling device for use with flowerpots according to the present invention.

The labeling device 11 in the present case comprises a mount 14 for a label roll 15 and a mount 16 for the empty roll 17. The mounts 14, 16 in the present case are corresponding spindles, at least the mount 16 comprising a rotary drive for winding onto the empty roll. Also provided is a drive device 18 which in the present case comprises two pinch rollers. The drive device 18 acts in the region in which the labels have already been peeled from the label strip 19. Furthermore, various deflection rollers are provided for guiding the label strip 19. In the region of the dispensing tongue 12, the portions of the label strip 19 lie close together and are guided substantially parallel to one another. Situated at the end of the dispensing tongue 12 is a deflection roller 20 at which the label strip 19 is deflected through approximately 180°, with the result that the labels 13 are peeled off at this point. A pressing roller 21 which is spring-loaded acts on the peeled-off label 13, as a result of which the adhesive side of the peeled-off label 13 is pressed onto the outer wall of the flowerpot 2 being guided past.

The labeling device 11 is connected to a positioning device 22 which makes it possible for the labeling device 11 to pivot and for the dispensing tongue 12 to be positioned against the flowerpots 2 to be labeled. The positioning device 22 in the present case comprises a joint 23 and a positioning arm 24. Moreover, provision is made in the embodiment represented for a mounting means 25 to be provided at the end of the positioning arm 24 for detachable mounting on the housing ring 5. The mounting means 25 is not represented in detail in FIG. 1. In the present case, however, it comprises a profile which engages over the housing ring 5 from above, i.e. is fitted onto the housing ring 5, and is, if appropriate, retained with a clamping action on the housing ring 5 via a bolted connection. A screw fixing or a permanent fastening, for example by way of a welded joint, is also possible in principle. In order to enable the positioning arm 24 to move with respect to the mounting means 25, the joint 23 is provided in between. The joint 23 in the present case is a type of hinge which pivots about a vertical axis X and thus allows the positioning arm 24 to move in the direction of arrow a.

Figure 3:
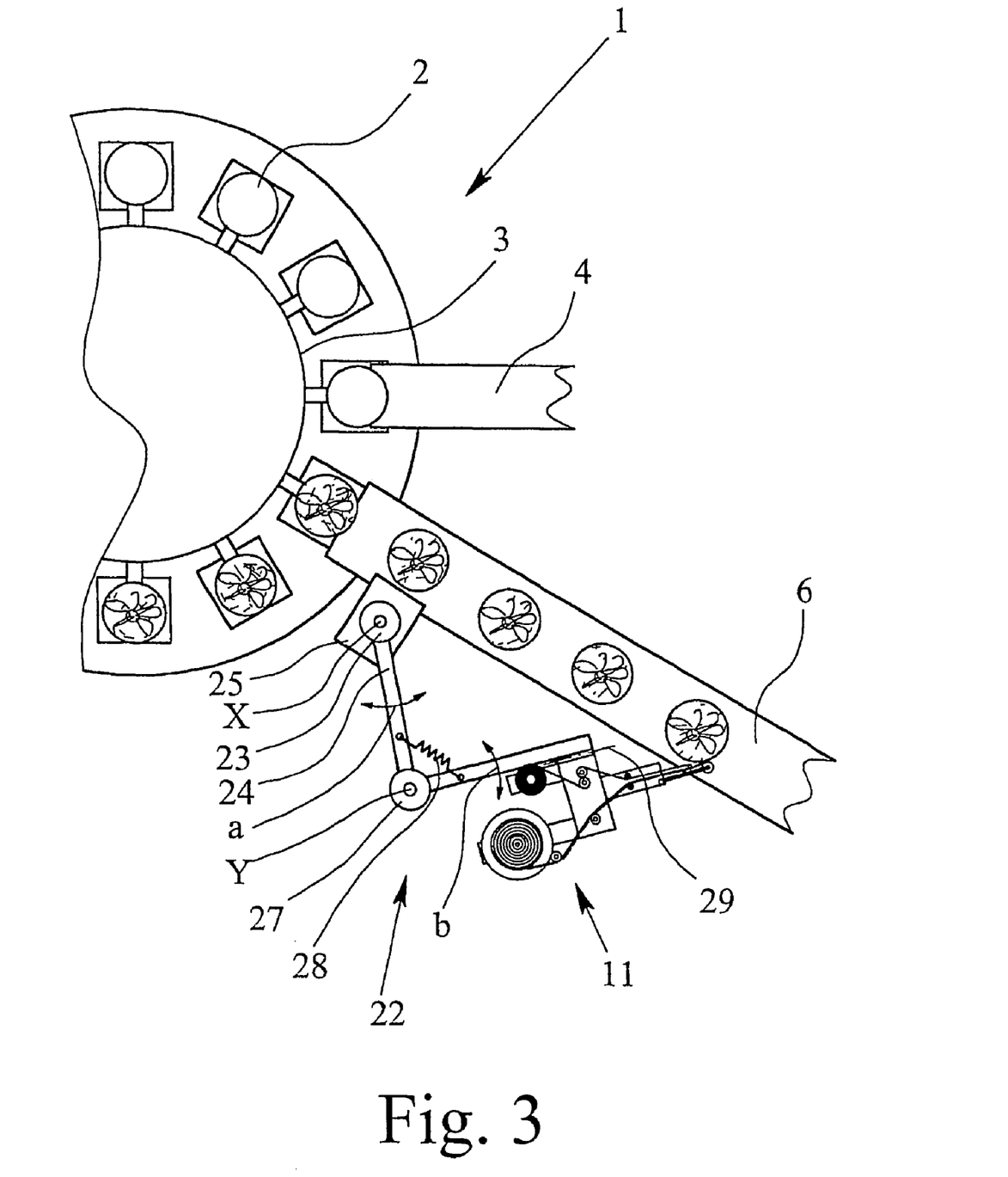
FIG. 3 is a schematic plan view, corresponding to FIG. 1, of another embodiment of a potting machine according to the present invention.

Moreover, the positioning device 22 comprises a further positioning arm 26 in the embodiments represented in FIGS. 1 and 3, the positioning arm 24 and the further positioning arm 26 being connected to one another via a further joint 27. The further joint 27 corresponds in terms of function to the joint 23, with the result that the further positioning arm 26 can be moved about the axis Y in the direction of movement b. The axis Y is parallel to the axis X. The labeling device 11 itself is connected to the further positioning arm 26 at its end.

A tension-spring means 28 is situated in the present case between the positioning arm 24 and the further positioning arm 26, which means that the dispensing tongue 12 bears with spring loading against the respective flowerpot 2 to be labeled. However, it is also possible to dispense with the tension-spring means 28 given the presence of the spring-loaded pressing roller 21.

A further joint 29 is situated in the present case between the further positioning arm 26 and the labeling device 11. The further joint 29 is in turn designed in the manner of a hinge which pivots about a horizontal axis Z, represented in FIG. 4. The pivoting movement about the further joint 29 thus enables the dispensing tongue 12 to be inclined as a function of the conicality of the flowerpots to be labeled. By contrast, the joint 23 and the further joint 27 together with the positioning arm 24 and the further positioning arm 26 can be used to position the labeling device 11 as a function of the size of the pot.

The potting machine 1 represented in FIG. 3 differs from that represented in FIG. 1 in that, instead of being mounted on the housing ring 5, the labeling device 11 is mounted on the discharge device 10. There are no further differences between the two embodiments.

Figure 4:
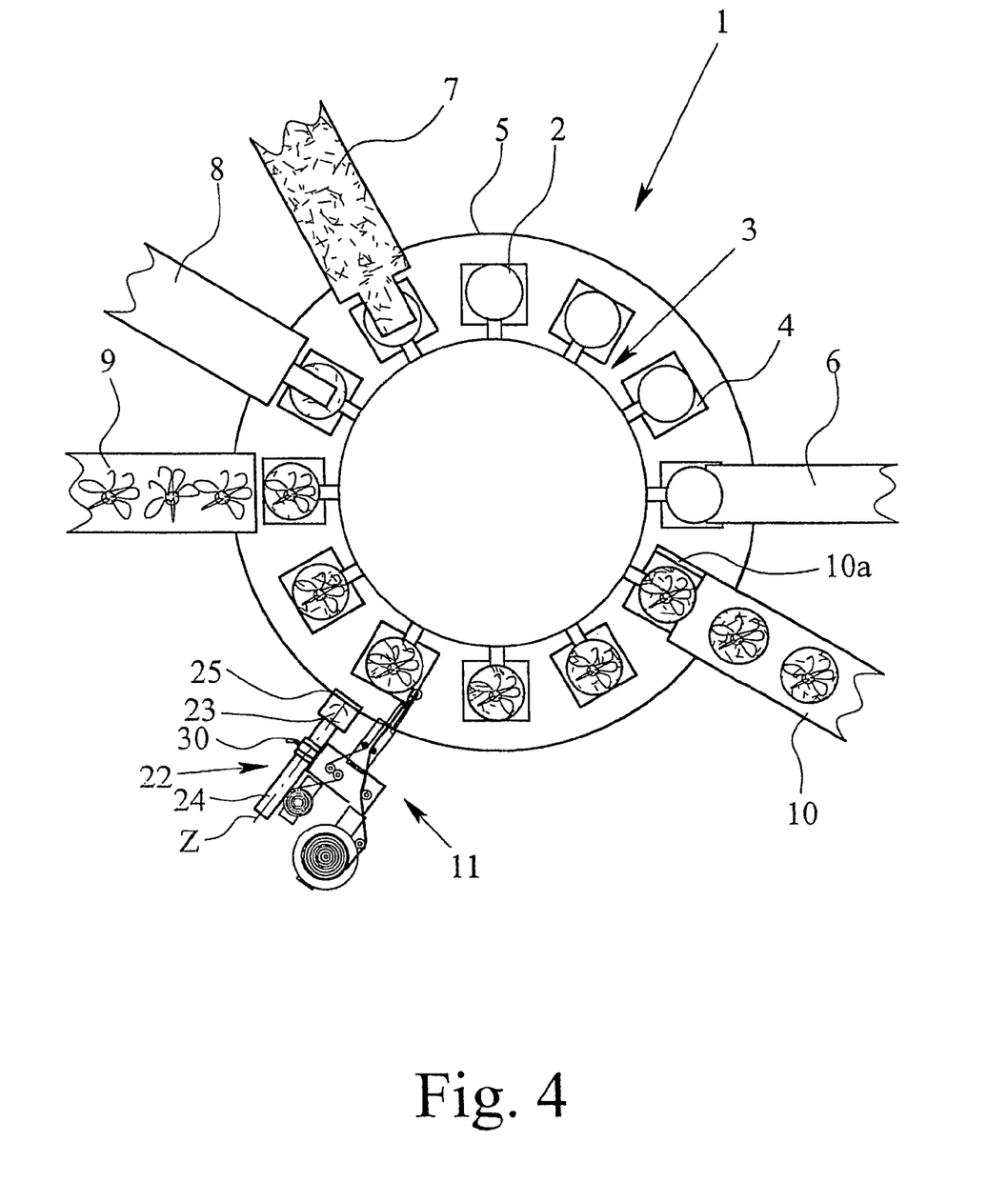
FIG. 4 is a schematic plan view of a further embodiment of a potting machine according to the present invention.
Figure 5:
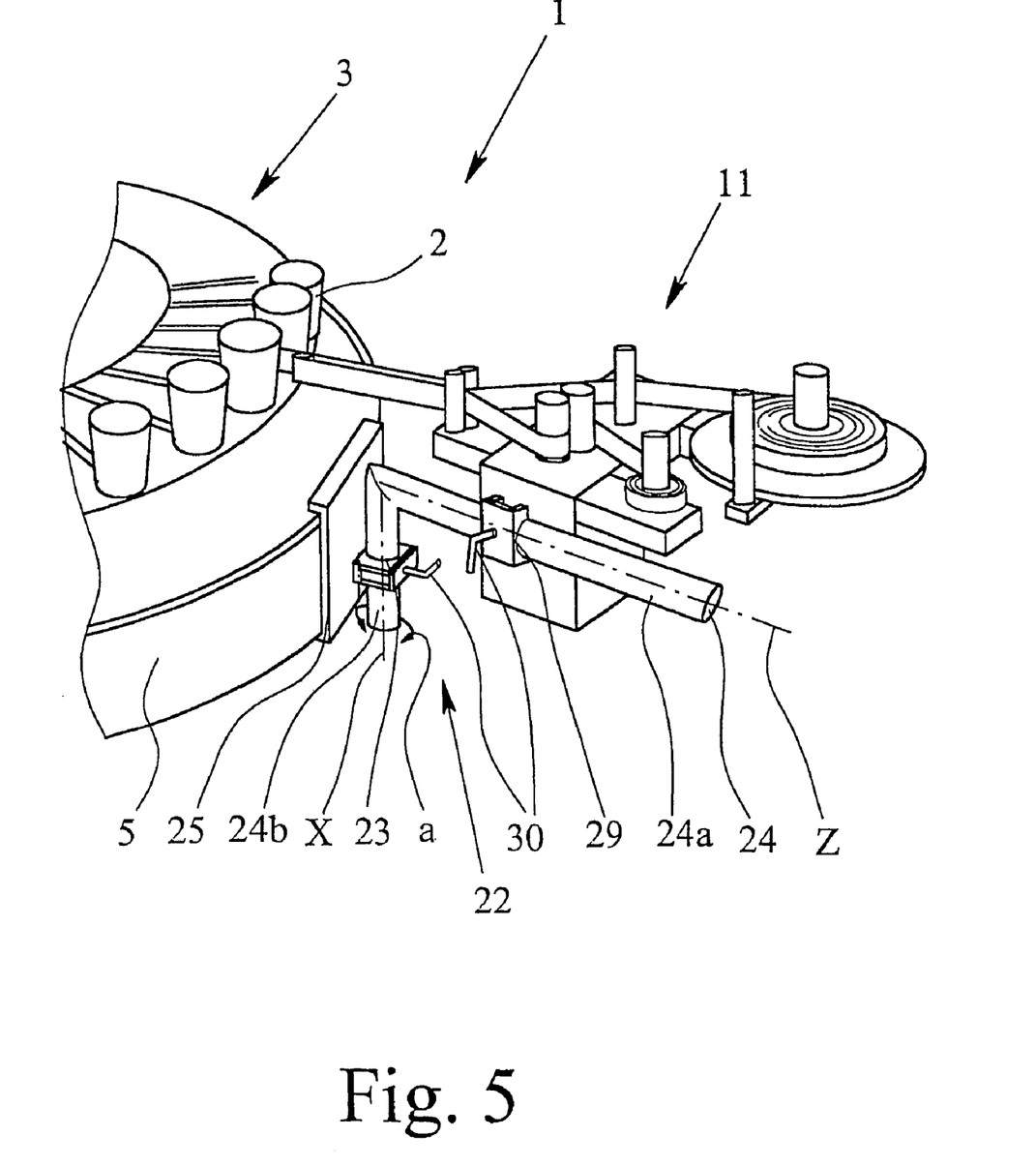
FIG. 5 is a perspective view of part of the potting machine from FIG. 4.

In the embodiment represented in FIGS. 4 and 5, the positioning device 22 comprises only one positioning arm 24. The positioning arm 24 is designed as an angle and comprises a horizontal leg 24a and a vertical leg 24b. The labeling device 11 is mounted on the horizontal leg 24a via the further joint 29. By contrast, the vertical leg 24b is connected via the joint 23 to the above-described mounting means 25 which is fitted onto the housing ring 5. Both the joint 23 and the further joint 29 are assigned a locking means 30 in the manner of a screw lever. Each of the locking means 30 here acts on the respective leg 24a, 24b. Once the locking means 30 on the joint 23 has been released, it is possible for the leg 24a, and thus the labeling device 11, to be pivoted about the axis X in direction a. Furthermore, since the leg 24b is elongated, a height adjustment can take place in the direction of the axis X. Once the correct pivoting position on the one hand and height position on the other hand have been set, the joint 23 is locked via the locking means 30. By contrast, once the locking means 30 of the joint 29 has been released, the labeling device 11 can be moved along the leg 24a on the one hand and be pivoted about the axis Z on the other hand. Once the correct position has been set, locking is effected via the locking means 30.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A potting machine (1) for potting flowerpots (2), with a conveying device (3) comprising a plurality of pot retainers (4) for a respective flowerpot (2), with a housing ring (5) surrounding the conveying device (3), and with a labeling device (11) for labeling the flowerpots (2), the labeling device (11) comprising a dispensing tongue (12) constructed and arranged for stripping off labels (13) and applying them to the flowerpots (2), a positioning device (22) comprising a first joint (23) and having a positioning arm (24) constructed and arranged for pivoting the labeling device (11) and positioning the dispensing tongue (12) against the flowerpots (2) being connected to the labeling device (11), the positioning device (22) comprising a second joint (29) enabling the dispensing tongue (12) to be inclined as a function of the conicality of the flowerpots (2) to be labeled, wherein said positioning arm (24) is constructed and arranged such that said pivoting of the labeling device (11) is around a first pivot axis (X) via said first joint (23), wherein said labeling device (11) is able to pivot about a longitudinal axis (Z) of at least one positioning arm (24,26) via said second joint (29), and wherein said first pivot axis (X) and said longitudinal axis (Z) are perpendicular to each other.

2. The potting machine according to claim 1, characterized in that a mounting means (25) is provided at the end of said positioning arm (24) for detachable mounting on one of the housing ring (5) or on a discharge device (10) assigned to said potting machine (1).

3. The potting machine according to claim 2, characterized in that said mounting means (25) is intended for frictional mounting.

4. The potting machine according to claim 2, characterized in that said mounting means (25) is intended for positive mounting.

5. The potting machine according to claim 2, characterized in that the joint (23) is provided between said mounting means (25) and said positioning arm (24).

6. The potting machine according to claim 2, characterized in that said positioning arm (24) is height-adjustable with respect to said mounting means (25).

7. The potting machine according to claim 1, characterized in that said positioning arm (24) is firmly connected via a mounting means to said housing ring (5) or to a discharge device (10) assigned to said potting machine (1).

8. The potting machine according to claim 1, characterized in that the positioning device (22) comprises at least one further positioning arm (26) and in that said positioning arm (24) and said further positioning arm (26) are connected to one another via a further joint (27).

9. The potting machine according to claim 8, characterized in that at least one spring-tension means (28) is provided between said positioning arm (24) and said further positioning arm (26) and/or between said positioning arm (24) and said housing ring (5) or a discharge device (10).

10. The potting machine according to claim 8, characterized in that said labeling device (11) is connected to said positioning arm (24) or to said further positioning arm (26).

11. The potting machine according to claim 8, characterized in that said labeling device (11) is able to pivot about a longitudinal axis (Z) of the positioning arm (24) or of said further positioning arm (26), or about an axis parallel thereto, via a further joint (29).

12. The potting machine according to claim 1, characterized in that said labeling device (11) is spring-loaded in such a way that said dispensing tongue (12) is positioned automatically against the flowerpots (2).

13. The potting machine according to claim 1, characterized in that said labeling device (11) is height-adjustable, particularly via said positioning device (22).

14. The potting machine according to claim 1, characterized in that said positioning arm (24) is designed as an angle with a horizontal leg (24*a*) and a vertical leg (24*b*).

15. The potting machine according to claim 1, characterized in that said first joint (23) and/or a plurality of further joints (27, 29) are designed in such a way that a movement is possible about at least two axes.

16. The potting machine according to claim 1, characterized in that the joint (23) and/or a plurality of further joints (27, 29) is or are assigned a locking means (30) for locking in any pivoting position.

17. A potting machine (1) for potting flowerpots (2), with a conveying device (3) comprising a plurality of pot retainers (4) for a respective flowerpot (2), with a housing ring (5) surrounding the conveying device (3), and with a labeling device (11) for labeling the flowerpots (2), the labeling device (11) comprising a dispensing tongue (12) constructed and arranged for stripping off labels (13) and applying them to the flowerpots (2), a positioning device (22) constructed and arranged with two pivot locations, one pivot location comprising a joint (23) and having a positioning arm (24) constructed and arranged for pivoting the labeling device (11) and positioning the dispensing tongue (12) against the flowerpots (2) being connected to the labeling device (11), wherein said labeling device (11) is spring-loaded in such a way that said dispensing tongue (12) is positioned automatically against the flowerpots (2), wherein said positioning arm (24) is constructed and arranged such that said pivoting of the labeling device (11) is around a first pivot axis (X) via said first joint (23), wherein said labeling device (11) is able to pivot about a longitudinal axis (Z) of at least one positioning arm (24,26) via said second joint (29), and wherein said first pivot axis (X) and said longitudinal axis (Z) are perpendicular to each other.

18. A potting machine (1) for potting flowerpots (2), with a conveying device (3) comprising a plurality of pot retainers (4) for a respective flowerpot (2), with a housing ring (5) surrounding the conveying device (3), and with a labeling device (11) for labeling the flowerpots (2), the labeling device (11) comprising a dispensing tongue (12) constructed and arranged for stripping off labels (13) and applying them to the flowerpots (2), a positioning device (22) comprising a joint (23) and having a positioning arm (24) constructed and arranged for pivoting the labeling device (11) and positioning the dispensing tongue (12) against the flowerpots (2) being connected to the labeling device (11), wherein said positioning device (22) further comprises at least one further positioning arm (26) and wherein said positioning arm (24) and said further positioning arm (26) are connected to one another via further joint (27) and wherein at least one spring-tension means (28) is provided between said positioning arm (24) and said further positioning arm (26) and/or between said positioning arm (24) and said housing ring (5) or a discharge device (10), wherein said positioning arm (24) is constructed and arranged such that said pivoting of the labeling device (11) is around a first pivot axis (X) via said first joint (23), wherein said labeling device (11) is able to pivot about a longitudinal axis (Z) of at least one positioning arm (24,26) via said second joint (29), and wherein said first pivot axis (X) and said longitudinal axis (Z) are perpendicular to each other.

19. A potting machine (1) for potting flowerpots (2), with a conveying device (3) comprising a plurality of pot retainers (4) for a respective flowerpot (2), with a housing ring (5) surrounding the conveying device (3), and with a labeling device (11) for labeling the flowerpots (2), the labeling device (11) comprising a dispensing tongue (12) constructed and arranged for stripping off labels (13) and applying them to the flowerpots (2), a positioning device (22) comprising a joint (23) and having a positioning arm (24) constructed and arranged for pivoting the labeling device (11) and positioning the dispensing tongue (12) against the flowerpots (2) being connected to the labeling device (11), wherein said positioning device (22) further comprises at least one further positioning arm (26) and wherein said positioning arm (24) and said further positioning arm (26) are connected to one another via a further joint (27), and wherein said labeling device (11) is able to pivot about a longitudinal axis (Z) of the positioning arm (24), or of said further positioning arm (26), or about an axis parallel thereto, via a further joint (29), wherein said positioning arm (24) is constructed and arranged such that said pivoting of the labeling device (11) is around a first pivot axis (X) via said first joint (23), and wherein said first pivot axis (X) and said longitudinal axis (Z) are perpendicular to each other.

* * * * *

UNITED STATES PATENT AND TRADEMARK OFFICE
CERTIFICATE OF CORRECTION

PATENT NO. : 7,637,052 B2  Page 1 of 1
APPLICATION NO. : 10/566447
DATED : December 29, 2009
INVENTOR(S) : Siedlaczek It is certified that error appears in the above-identified patent and that said Letters Patent is hereby corrected as shown below:

Column 1,
    Line 53, replace "tom" with -- torn --.

Signed and Sealed this

Twenty-seventh Day of April, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,637,052 B2 | |
| APPLICATION NO. | : 10/566447 | |
| DATED | : December 1, 2009 | |
| INVENTOR(S) | : Goldberg | |

It is certified that error appears in the above-identified patent and that said Letters Patent is hereby corrected as shown below:

Column 2, Line 51    Delete: "separates"
                     Insert: -- separate --

Column 3, Line 49    Delete: "additional"
                     Insert: -- addition --

Column 4, Line 34    Delete: "receiver 30"
                     Insert: -- receiver 40 --

Column 4, Line 39    Delete: "he"
                     Insert: -- The --

Column 5, Line 62    Delete: "is create"
                     Insert: -- is to create --

Column 6, Line 5     Delete: "form"
                     Insert: -- from --

Column 8, Line 28    Delete: "array means which"
                     Insert: -- array which --

Column 10, Line 60   Delete: "0 0 a63 a64 a56 a66"
                     Insert: -- 0 0 a63 a64 a65 a66 --

Column 13, Line 21   Delete: "N"
                     Insert: -- M --

Column 13, Line 54   Delete: "MINO"
                     Insert: -- MIMO --

Signed and Sealed this
Third Day of July, 2012

David J. Kappos
*Director of the United States Patent and Trademark Office*

CERTIFICATE OF CORRECTION (continued)
U.S. Pat. No. 7,637,052 B2

| | |
|---|---|
| Column 15, Line 19 | Delete: "N"<br>Insert: -- M -- |
| Column 15, Line 23 | Delete: "N"<br>Insert: --M -- |
| Column 15, Line 46 | Delete: "N"<br>Insert: -- M -- |
| Column 16, Line 39 | Delete: "ECA"<br>Insert: -- PCA -- |

UNITED STATES PATENT AND TRADEMARK OFFICE
CERTIFICATE OF CORRECTION

| | |
|---|---|
| PATENT NO. | : 7,637,052 B2 |
| APPLICATION NO. | : 10/566447 |
| DATED | : December 29, 2009 |
| INVENTOR(S) | : Udo Siedlaczek |

It is certified that error appears in the above-identified patent and that said Letters Patent is hereby corrected as shown below:

This certificate supersedes the Certificate of Correction issued July 3, 2012. The Certificate is vacated since errors appearing on the Certificate of Correction does not correspond to text in the printed patent. The Certificate of Correction should not have been issued.

Signed and Sealed this
Twenty-fifth Day of September, 2012

David J. Kappos
*Director of the United States Patent and Trademark Office*